US011908188B2

(12) United States Patent
Lu et al.

(10) Patent No.: US 11,908,188 B2
(45) Date of Patent: Feb. 20, 2024

(54) IMAGE ANALYSIS METHOD, MICROSCOPE VIDEO STREAM PROCESSING METHOD, AND RELATED APPARATUS

(71) Applicant: Tencent Technology (Shenzhen) Company Limited, Shenzhen (CN)

(72) Inventors: Weijia Lu, Shenzhen (CN); Jianhua Yao, Shenzhen (CN); Xiao Han, Shenzhen (CN); Niyun Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 502 days.

(21) Appl. No.: 17/225,966

(22) Filed: Apr. 8, 2021

(65) Prior Publication Data
US 2021/0224546 A1 Jul. 22, 2021

Related U.S. Application Data

(63) Continuation of application No. PCT/CN2020/078228, filed on Mar. 6, 2020.

(30) Foreign Application Priority Data

Mar. 8, 2019 (CN) .......................... 201910176877.9

(51) Int. Cl.
*G06T 7/00* (2017.01)
*G06V 20/40* (2022.01)
(Continued)

(52) U.S. Cl.
CPC .......... *G06V 20/41* (2022.01); *G02B 21/365* (2013.01); *G06N 3/045* (2023.01); *G06T 7/0012* (2013.01);
(Continued)

(58) Field of Classification Search
CPC ........ G06V 20/41; G06V 20/46; G06V 20/69; G06V 20/40; G06V 20/693; G06V 20/698;
(Continued)

(56) References Cited

U.S. PATENT DOCUMENTS 10,510,144 B2 * 12/2019 Zur .................. A61B 1/000096
2005/0180730 A1 8/2005 Huh et al.
(Continued)

FOREIGN PATENT DOCUMENTS

| CN | 103118220 A | 5/2013 |
|---|---|---|
| CN | 103533237 A | 1/2014 |

(Continued)

OTHER PUBLICATIONS

Guotai Wang et al., "Deep1GeoS: A Deep Interactive Geodesic Framework for Medical Image Segmentation", Arxiv.org, Cornell University Library, Jul. 3, 2017, XP081293067, 14 pgs.
(Continued)

*Primary Examiner* — Jose L Couso
(74) *Attorney, Agent, or Firm* — Morgan, Lewis & Bockius LLP

(57) ABSTRACT

Embodiments of this application disclose methods, systems, and devices for medical image analysis and medical video stream processing. In one aspect, a method comprises extracting video frames from a medical image video stream that includes at least two pathological-section-based video frames. The method also comprises identifying single-frame image features in the video frames, mapping the single-frame image features into single-frame diagnostic classification results, and performing a classification mapping based on a video stream feature sequence that comprises the single-frame image features. The classification mapping comprises performing a convolution operation on the video
(Continued)

- S202: Extract video frames in a medical image video stream, the medical image video stream including at least two pathology-section-based video frames
- S204: Identify single-frame image features in the video frames, and map the single-frame image features into single-frame diagnostic classification results
- S206: Perform classification mapping based on a video stream feature sequence to obtain a target diagnostic classification result stream feature sequence through a preset convolutional layer, obtaining a convolution result in accordance with the convolution operation, and performing fully connected mapping on the convolution result through a preset fully connected layer. In accordance with the classification mapping, a target diagnostic classification result corresponding to the medical image video stream is determined.

17 Claims, 5 Drawing Sheets

(51) Int. Cl.
  *G02B 21/36* (2006.01)
  *G06N 3/045* (2023.01)
(52) U.S. Cl.
  CPC .... *G06V 20/46* (2022.01); *G06T 2207/10056* (2013.01)
(58) Field of Classification Search
  CPC .. G06V 10/25; G06V 10/698; G06V 10/7715; G06V 10/44; G06V 10/761; G06V 10/764; G06V 10/771; G06V 10/774; G06V 2201/03; G06V 10/454; G06V 10/54; G06V 10/82; G06V 30/18057; G02B 21/365; G02B 21/36; G06N 3/045; G06N 3/02; G06N 3/08–088; G06N 3/0445; G06N 3/0454; G06N 3/4046; G06N 7/00; G06N 20/00; G06T 7/0012; G06T 2207/10056; G06T 2207/10016; G06T 2207/20081; G06T 2207/20084; G06T 2207/30096; G06T 7/00; G06T 7/0014; G06T 7/11; G06T 7/143; G06T 2207/10068; G06T 2207/30004; G06T 2207/30024; G06T 2207/30028; G06T 2207/30016; G06T 2207/30092; G06T 2207/20076; G06T 3/4046; G06T 9/002; G06F 18/24; G06F 18/2413; G06F 18/214; G06F 18/2136; G06F 18/2155; G06F 18/2414; G16H 30/00; G16H 50/20; G16H 40/40; G16H 50/50; G16H 50/60; G16H 50/70; G16H 30/20; G16H 10/60; A61B 1/2736; A61B 1/000094; A61B 1/000096; A61B 1/005; G06K 7/1482; Y10S 128/925
  See application file for complete search history.

(56) References Cited

U.S. PATENT DOCUMENTS

| | | | | |
|---|---|---|---|---|
| 2011/0301447 | A1* | 12/2011 | Park | G06T 7/0016 600/407 |
| 2016/0078625 | A1* | 3/2016 | Tajbakhsh | G06T 7/0012 382/128 |
| 2017/0061285 | A1* | 3/2017 | Hikone | G06N 20/00 |
| 2018/0075597 | A1* | 3/2018 | Zhou | A61B 6/037 |
| 2018/0225820 | A1* | 8/2018 | Liang | G16H 20/40 |
| 2019/0122360 | A1* | 4/2019 | Zhang | G06F 18/24 |
| 2019/0130564 | A1* | 5/2019 | Kawabata | G06T 7/0012 |
| 2019/0244348 | A1* | 8/2019 | Buckler | G06N 3/08 |
| 2020/0219262 | A1* | 7/2020 | Hsiao | G06V 10/764 |
| 2020/0226422 | A1* | 7/2020 | Li | G06N 3/08 |
| 2020/0388029 | A1* | 12/2020 | Saltz | G06V 10/267 |
| 2021/0068791 | A1* | 3/2021 | Gebre | G06V 10/762 |

FOREIGN PATENT DOCUMENTS

| | | | | |
|---|---|---|---|---|
| CN | 105007524 | A | 10/2015 | |
| CN | 107341462 | A | 11/2017 | |
| CN | 107533649 | A | 1/2018 | |
| CN | 109102491 | A | 12/2018 | |
| CN | 109241946 | A | 1/2019 | |
| CN | 109255367 | A | 1/2019 | |
| CN | 109377470 | A | 2/2019 | |
| CN | 109920518 | A | 6/2019 | |
| CN | 110491502 | A | 11/2019 | |
| KR | 20170128454 | | * 11/2017 | ......... G06V 10/7715 |
| KR | 20170128454 | A | * 11/2017 | ......... G06V 10/7715 |
| WO | WO 2018229490 | A1 | 12/2018 | |

OTHER PUBLICATIONS

Extended European Search Report, EP20770930.4, dated Apr. 11, 2022, 11 pgs.
Qi Xuan et al., "CNN Based Key Frame Extraction for Face in Video Recognition", 2018 IEEE 4$^{th}$ International Conference on Identity, Security, and Behavior Analysis (ISBA), IEEE, Jan. 11, 2018, pp. 1-8, XP033329301.
Tencent Technology, WO, PCT/CN2020/078228, May 29, 2020, 5 pgs.
Tencent Technology, IPRP, PCT/CN2020/078228, dated Aug. 25, 2021, 6 pgs.
Tencent Technology, ISR, PCT/CN2020/078228, dated May 29, 2020, 2 pgs.
Yu Xing, "Video Action Recognition Technology Research Based on Deep Learning," A Master Thesis Submitted to University of Electronic Science and Technology of China, School of Information and Communication Engineering, May 28, 2018, 73 pgs.

* cited by examiner

IMAGE ANALYSIS METHOD, MICROSCOPE VIDEO STREAM PROCESSING METHOD, AND RELATED APPARATUS

CROSS-REFERENCE TO RELATED APPLICATIONS

This application is a continuation application of PCT Patent Application No. PCT/CN2020/078228, entitled "IMAGE ANALYSIS METHOD, MICROSCOPE VIDEO STREAM PROCESSING METHOD, AND RELATED APPARATUS" filed on Mar. 6, 2020, which claims priority to Chinese Patent Application No. 201910176877.9, filed with the China National Intellectual Property Administration on Mar. 8, 2019 and entitled "MEDICAL IMAGE ANALYSIS METHOD, APPARATUS, COMPUTER DEVICE, AND STORAGE MEDIUM", all of which are incorporated herein by reference in their entirety.

FIELD OF THE TECHNOLOGY

This application relates to the field of image processing, and in particular, to image analysis and microscope video stream processing.

BACKGROUND OF THE DISCLOSURE

A medical image refers to an image of internal tissue of a human body or a part of the human body obtained in a non-invasive manner for medical treatment or medical research. An analysis of a medical image can provide an auxiliary basis for a doctor to obtain an accurate diagnosis result.

SUMMARY

Based on this, in response to the foregoing technical problems, it is necessary to provide an image analysis method, a microscope video stream processing method, and a related apparatus that can improve the accuracy of a classification result of an object for medical diagnostics.

In an aspect, an embodiment of this application provides an image analysis method for medical diagnostics, performed by a computer device, the method including:
 extracting video frames from a medical image video stream that includes at least two pathological-section-based video frames;
 identifying single-frame image features in the video frames;
 mapping the single-frame image features into single-frame diagnostic classification results;
 performing classification mapping based on a video stream feature sequence that comprises the single-frame image features, the classification mapping comprising:
  performing a convolution operation on the video stream feature sequence through a preset convolutional layer;
  obtaining a convolution result in accordance with the convolution operation; and
  performing fully connected mapping on the convolution result through a preset fully connected layer; and
 determining a target diagnostic classification result corresponding to the medical image video stream and in accordance with the classification mapping.

In another aspect, an embodiment of this application provides an image analysis apparatus, including:
 a video frame extraction module, configured to extract video frames in an image video stream, the image video stream including at least two pathological-section-based video frames;
 a single-frame classification module, configured to identify single-frame image features in the video frames, and map the single-frame image features into single-frame classification results; and
 a classification mapping module, configured to perform classification mapping based on a video stream feature sequence to obtain a target classification result, the video stream feature sequence including the single-frame image features and the single-frame classification results of the video frames in the image video stream.

In another aspect, an embodiment of this application provides an image analysis system, including a microscope, a collection apparatus, and an image analysis device;
 the collection apparatus being configured to collect video data under a field of view of the microscope to obtain an image video stream, the image video stream including at least two pathological-section-based video frames;
 the image analysis device being configured to extract the video frames in the image video stream; identify single-frame image features in the video frames, and map the single-frame image features into single-frame classification results; and perform classification mapping based on a video stream feature sequence to obtain a target classification result, the video stream feature sequence including the single-frame image features and the single-frame classification results of the video frames in the image video stream.

In another aspect, an embodiment of this application provides a microscope video stream processing system, including: a collection apparatus, a microscope, a network interface, and a smart chip;
 the collection apparatus being configured to collect video data under a field of view of the microscope to obtain an image video stream, the image video stream including at least two pathological-section-based video frames;
 the microscope being configured to extract the video frames of the image video stream; identify single-frame image features in the video frames, and map the single-frame image features into single-frame classification results; obtain operation information corresponding to the image video stream, and determine an operation sequence based on the operation information; and obtain patient information corresponding to the image video stream via the network interface, and determine a patient sequence based on the patient information; and
 the smart chip being configured to perform classification mapping based on the operation sequence, the patient sequence, and a video stream feature sequence, to obtain a target classification result, the video stream feature sequence including the single-frame image features and the single-frame classification results of the video frames in the image video stream.

In another aspect, an embodiment of this application provides a microscope video stream processing method, performed by a computer device, the method including:
 extracting video frames in an image video stream, the image video stream including at least two target-object-based video frames under a field of view of a microscope;

identifying single-frame image features in the video frames, and mapping the single-frame image features into single-frame classification results;

obtaining operation information corresponding to the image video stream, and determining an operation sequence based on the operation information;

obtaining patient information corresponding to the image video stream, and determining a patient sequence based on the patient information; and performing classification mapping based on the operation sequence, the patient sequence, and a video stream feature sequence to obtain a target classification result, the video stream feature sequence including the single-frame image features and the single-frame classification results of the video frames in the image video stream.

In another aspect, an embodiment of this application provides a computer device, including:

a processor, a communication interface, a memory, and a communication bus, the processor, the communication interface, and the memory communicating with each other by using the communication bus; and the communication interface being an interface of a communication module;

the memory being configured to store program code and transmit the program code to the processor; and the processor being configured to call instructions of the program code in the memory to perform the foregoing image analysis method or microscope video stream processing method.

In another aspect, an embodiment of this application provides a non-transitory computer-readable storage medium, configured to store one or more computer programs, the one or more computer programs being configured to perform the foregoing image analysis method or microscope video stream processing method.

In another aspect, an embodiment of this application provides a computer program product including computer instructions, the product, when running on a computer, causing the computer to perform the foregoing image analysis method or microscope video stream processing method.

According to the foregoing image analysis method, microscope video stream processing method, and related apparatus, video frames in an image video stream are extracted, the image video stream including at least two target-object-based (e.g., pathological-section-based) video frames; single-frame image features of the video frames is identified, and the single-frame image features are mapped into single-frame classification results; and classification mapping is performed based on a video stream feature sequence to obtain a target classification result, the video stream feature sequence including the single-frame image features and the single-frame classification results of the video frames. Because feature extraction and classification mapping are performed based on an image video stream that includes at least two video frames, and information in a time dimension in the image video stream is properly used to obtain a target classification result, accuracy of the classification result can be improved, to provide an accurate basis for classification of an object.

DESCRIPTION OF EMBODIMENTS

To make the objectives, technical solutions, and advantages of this application clearer and more comprehensible, the following further describes this application in detail with reference to the accompanying drawings and the embodiments. It is to be understood that the specific embodiments described herein are only used for explaining this application, and are not used for limiting this application.

Figure 1:
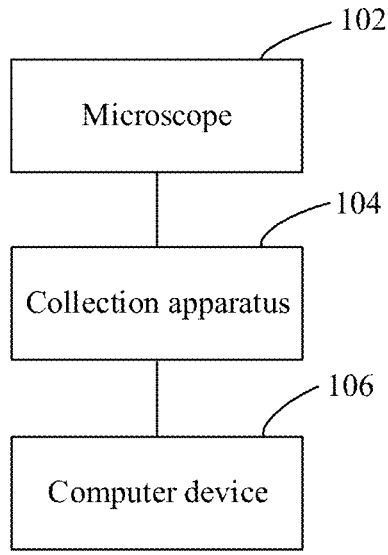
FIG. 1 is a schematic diagram of an application environment diagram of a medical image analysis method according to some embodiments of this application.

FIG. 1 is a schematic diagram of an application environment diagram of a medical image analysis method according to some embodiments. A doctor puts a pathology section under a microscope 102 and observes the pathology section. When the doctor observes the section, video data under a field of view of the microscope 102 is collected by a collection apparatus 104 to obtain a medical image video stream. The medical image analysis method is applicable to a computer device 106. The computer device 106 obtains the medical image video stream, the medical image video stream including at least two pathology-section-based video frames; extracts the video frames of the medical image video stream; identifies single-frame image features in the video frames, and maps the single-frame image features into single-frame diagnostic classification results; and performs classification mapping based on a video stream feature sequence, to obtain a target diagnostic classification result, the video stream feature sequence including the single-frame image features and the single-frame diagnostic classification results of the video frames. The computer device 106 may be a terminal or a server. The terminal may be a desktop device or a mobile terminal. The server may be an independent physical server, a physical server cluster, or a virtual server.

The image analysis method provided in the embodiments of this application can analyze various types of images to obtain a classification result of a target object in the images. Diagnostic classification performed on a pathology section in a medical image is an application of the foregoing image analysis method in a specific scenario. Solutions provided in the embodiments of this application are also applicable to other scenarios involving classification of an object in an image.

In the following embodiments, for ease of description, the scenario of the medical field is mainly used as an example to describe the solutions provided in the embodiments of this application. In the process of describing the embodiments based on this scenario of the medical field, mainly by using a medical image video stream as an example of an image video stream, using a diagnostic classification result as an example of a classification result, and using a pathology section as an example of a target object, object classification is applied to diagnostic classification of a pathology section in a medical image video stream.

Figure 2:
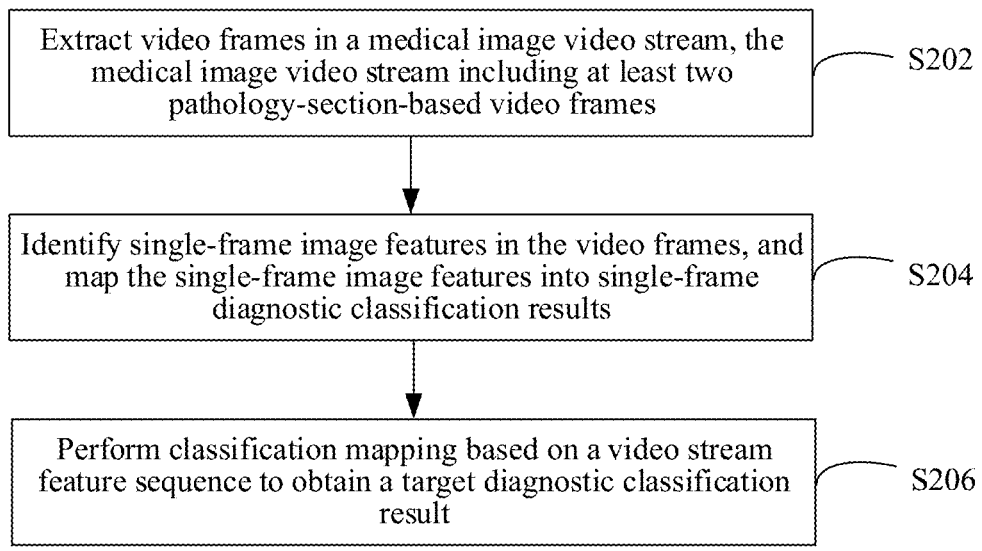
FIG. 2 is a schematic flowchart of an image analysis method according to some embodiments of this application.

As shown in FIG. 2, in some embodiments, an image analysis method is provided. This method can be run on the computer device in FIG. 1. The image analysis method includes the following steps.

S202: Extract video frames in an image video stream, the image video stream including at least two target-object-based video frames.

The computer device can obtain the image video stream, for example, a medical image video stream. The medical image video stream may be a video stream that is under a field of view of a microscope and that is collected by a collection apparatus when a doctor observes a pathology section through the microscope. The medical image video stream includes at least two pathology-section-based video frames, that is, includes at least two pathology-section-based tissue section images.

The microscope is widely applied to clinical diagnosis and scientific research. The pathology-section-based medical image video streams can be used to examine pathomorphological characteristics of body organs, tissue or cells, to clarify a cause, pathogenesis and development of a disease, and provide a basis for the doctor to evaluate and diagnose diseased tissue.

A traditional medical imaging picture under a field of view of a microscope is a single pathological picture in a fixed field of view. There are at least two pathology-section-based video frames in a medical image video stream in this embodiment. The medical image video stream is a collection of multi-field-of-view pathological pictures obtained by repeatedly observing suspected lesion regions when a doctor is observing a section by moving a camera, switching magnifications and other operations, and the collection combines information under a plurality of fields of view of a microscope. Because the medical image video stream records all the information in the field of view of the microscope when the doctor observes the pathology section, information about a single pathology section observed by the doctor in the field of view of the microscope is used as a continuous video stream to prevent the doctor from ignoring tiny lesion regions in the process of rapidly moving the pathology section. Therefore, the medical image video stream provides more information than a single-frame picture does, to help the doctor diagnose and find tiny lesion regions.

A plurality of different types of pathology sections may be viewed under a microscope, such as a lung tissue section and a heart tissue section. The medical image analysis method based on this embodiment may be deployed to a plurality of application scenarios, thereby making it convenient for a doctor to use.

The computer device can analyze the medical image video stream, and extract video frames from the medical image video stream. Further, a timestamp corresponding to each video frame is recorded while the video frames are extracted. Therefore, operation information corresponding to the video stream can be determined according to an inter-frame difference between the video frames of the medical image video stream, and time interval information can be provided when an operation sequence is determined based on the operation information.

Video frames can be extracted from a medical image video stream by using a neural network model obtained by training, to obtain the video frames. Alternatively, video frames can be extracted from a medical image video stream by using an algorithm based on video stream frame dividing.

S204: Identify single-frame image features in the video frames, and map the single-frame image features into single-frame classification results.

After the video frames are extracted, image feature extraction can be performed on each extracted video frame to obtain the single-frame image features of the video frames, and the single-frame image features can be mapped into single-frame diagnostic classification results. A single-frame image classification algorithm can be used as a classifier. The classifier can be an image-based classifier, into which a single image is inputted and which outputs a diagnostic classification result of the single image. Image feature extraction can be performed on each video frame by using the classifier to obtain the single-frame image features of the video frames, and the single-frame image features can be mapped into single-frame diagnostic classification results by using the classifier. This method can continue to use an existing classifier based on a single picture or a single-picture feature, saving development costs.

An image feature extraction algorithm can alternatively be used to perform image feature extraction on each extracted video frame to obtain the single-frame image features of the video frames, then the single-frame image features are inputted into an image-feature-based classifier, and the single-frame image features are mapped into the single-frame diagnostic classification results. The image feature of a single picture is inputted into the image-feature-based classifier, which outputs the diagnostic classification result of the single picture.

S206: Perform classification mapping based on a video stream feature sequence to obtain a target classification result. The video stream feature sequence includes the single-frame image features and the single-frame classification results of the video frames in the image video stream.

The computer device can perform classification mapping based on the video stream feature sequence to obtain the target classification result.

In a possible implementation, a preset mapping rule can be used to perform classification mapping on the video feature sequence. The preset mapping rule is a mapping rule that is set in advance, for example, a neural network model obtained by training, or another mapping rule for performing classification mapping on a video stream feature sequence to map the sequence into a target classification result. The video stream feature sequence may be inputted into the neural network model obtained by training. The image video stream may alternatively be inputted into the neural network model obtained by training. The neural network model obtained by training performs feature extraction on the image video stream to obtain the video stream feature sequence, and performs classification mapping based on the video stream feature sequence to obtain the target classification result. In this embodiment, the single-frame image features and the single-frame classification results of video frames are inputted into the preset mapping rule, that is, inputted into the neural network model obtained by training, which outputs the target classification result obtained by the classification mapping.

The neural network model obtained by training needs to obtain a training sample before being trained. Each sample object in the training sample may be a diagnostic classification marker which includes a medical image video stream and corresponds to the medical image video stream, or a diagnostic classification marker which includes the single-frame image features and the single-frame diagnostic classification results of the video frames and corresponds to the medical image video stream. The diagnostic classification marker is a marker of a diagnosis result corresponding to the medical image video stream, and may be a marker corresponding to a diagnosis result determined by the doctor according to the medical image video stream of the sample object.

Furthermore, the sample object may further include a key-frame marker. The key-frame marker may be determined by the key-frame information determined by the doctor according to the medical image video stream of the sample object. For example, while a doctor gives a diagnosis result, information about a frame of picture a based on which the doctor gives the diagnosis result is given, that is, key-frame information; a representation v of the picture a in a feature space is calculated, and moreover in this space, a picture a' corresponding to v' which is close to v is calculated based on a distance index; and a set {a'} formed by a' is a key frame, and a video frame corresponding to the set {a'} is marked with a marker, which is a key-frame marker. In this case, classification mapping is performed based on the video stream feature sequence, and the target diagnostic classification result obtained includes the diagnostic classification result corresponding to the medical image video stream and the key-frame information.

According to the foregoing image analysis method, an image video stream is obtained, the image video stream including at least two target-object-based video frames; the video frames of the image video stream are extracted; single-frame image features of the video frames is identified, and the single-frame image features are mapped into single-frame classification results; and classification mapping is performed based on a video stream feature sequence to obtain a target classification result, the video stream feature sequence including the single-frame image features and the single-frame classification results of the video frames. Because feature extraction and classification mapping are performed based on an image video stream that includes at least two video frames, and information in a time dimension in the image video stream is properly used to obtain a target classification result, accuracy of the classification result can be improved, to provide an accurate basis for classification of an object.

In some embodiments, the computer device and the collection apparatus can be integrated on the microscope. In some embodiments, the collection apparatus and the computer device can alternatively be set separately independently, an image video stream is collected by the collection apparatus, and an image analysis is performed on the collected image video stream by the computer device to obtain a target classification result.

In an embodiment where the collection apparatus and the computer device are set separately independently, the medical image analysis and the medical image obtaining are processed separately. In an embodiment where the computer device and the collection apparatus are integrated on the microscope, if a suspicious region is found in a frame of medical imaging picture of a medical image video stream, there is no need to reconfirm or review regions around the suspicious region under the microscope, and it is only necessary to view subsequent video frames according to an original switching habit of a doctor. Therefore, there is neither need to switch to a field of view of the microscope again, nor need to spend some time finding the suspicious region in the field of view of the microscope. Instead, the doctor's habit of directly observing the section under the microscope can be retained, and the doctor can view the suspicious region by viewing the medical image video stream collected while observing the section, to avoid operation inconvenience caused and extra time consumed by repeatedly switching to the field of view of the microscope when the doctor repeatedly views the section.

In addition, to further improve the accuracy of the classification result, the extracting the video frames of the image video stream includes: extracting pending video frames of the image video stream; and sharpening the pending video frames to obtain the video frames. In the process of extracting the medical image video stream to obtain the pending video frames, the obtained pending video frames are not necessarily clear, which consequently affects the accuracy of a target diagnostic classification result that is finally obtained by performing operations such as image feature extraction and classification mapping on the unclear pending video frames. Therefore, in this embodiment, the pending video frames extracted from the medical image video stream are first sharpened, and then image feature extraction and classification mapping are performed on the sharpened video frames, thereby further improving the accuracy of the diagnostic classification result.

In an embodiment, the target classification result includes a classification result corresponding to the image video stream and key-frame information.

In terms of the key frame, in a process of analyzing an image video stream to obtain a classification result, weights of effects of frames on the classification result are sorted in descending order, and a frame whose effect weight ranks at a preceding preset place is used as a key frame. For example, a frame whose effect weight ranks first may be used as a key frame; or a frame whose effect weight ranks first may be used as a first key frame, and frames whose effect weights rank second and third may be used as second key frames. The key-frame information is information indicating which frame in an image video stream is a key frame. For example, the key-frame information can be represented by a time-stamp or by a serial number of a video frame.

If the preset mapping rule is a neural network model obtained by training, before the neural network model is trained, a medical image video stream of each sample object in the training sample can be annotated with key frames to obtain diagnostic classification markers. Alternatively, an attention mechanism may be used in the neural network model to assign different weights to all video frames, and then the key-frame information can be determined according to the weights without the need to perform key-frame annotation before training. Therefore, labor costs required for a large amount of annotation can be saved.

In the medical image analysis method based on this embodiment, a target diagnostic classification result includes a diagnostic classification result corresponding to a medical image video stream and key-frame information. Compared with the medical image analysis method in which a target diagnostic classification result does not include key-frame information, the medical image analysis method in this embodiment can provide information about a key frame that has a larger effect in the process of obtaining a diagnostic classification result, to provide a more detailed basis for a doctor to make a diagnosis.

In an embodiment, the performing classification mapping based on a video stream feature sequence to obtain a target classification result includes: performing classification mapping based on the single-frame image features and the single-frame classification results to obtain the classification result corresponding to the image video stream; and determining the key-frame information based on weight information corresponding to the video frames in the image video stream in the classification mapping process.

In this embodiment, the single-frame image features and single-frame diagnostic classification results of the video frames are used as input of the classification mapping to obtain the diagnostic classification result and the key-frame information, which are used as output of the classification mapping. The key-frame information is determined based on weight information corresponding to the video frames in the classification mapping process. For example, weights corresponding to the video frames obtained through the attention mechanism in the classification mapping process can be sorted, and a frame whose weight ranks at a preceding preset place is used as a key frame. The key-frame information may include weight information corresponding to the key frame and position information of the key frame. For example, the key-frame information can be embodied by displaying the medical image video stream and displaying the key-frame information at a preset position.

Thumbnails of the video frames in the medical image video stream are displayed at preset positions, and positional relationships between the video frames are reflected through a sorting order of the thumbnails. Display colors of the video frames can be used to indicate whether a frame is a key frame, and weight information of the frame is expressed by a shade of a display color. Therefore, a key frame and a non-key frame are distinguished by a first display mode, and weights of key frames are distinguished by a second display mode, to provide a more detailed basis for a doctor to make a diagnosis. It can be understood that the first display mode for distinguishing a key frame from a non-key frame is not limited to use of colors, and the second display mode for indicating magnitudes of weights is not limited to use of shades of colors.

In an embodiment, the performing classification mapping based on a video stream feature sequence to obtain a target classification result includes: obtaining operation information corresponding to the image video stream, and determining an operation sequence based on the operation information; and performing classification mapping based on the operation sequence and the video stream feature sequence to obtain the target classification result.

The operation information may be collected by using other collection methods. For example, operation actions of a doctor can be collected by using another collection apparatus, and then the operation information is determined by using a video analysis method. The operation information can alternatively be obtained by independent entry of a doctor or relevant staff. The operation information can alternatively be obtained by analyzing the medical image video stream collected by the collection apparatus under a field of view of a microscope. Specifically, for example, a collected object in a video frame of the medical image video stream is compared with the same collected object in a previous video frame to determine a change of the same collected object, to determine information about an operation between the video frame and the previous video frame.

The operation information may include: a movement direction (which can be represented by Dir) of an objective lens, a movement distance (which can be represented by X) of the objective lens, and a staying time (which can be represented by deltaT) on a video frame. The movement direction of the objective lens may include a three-dimensional direction, for example, upward, downward, leftward, and rightward directions relative to the horizontal plane of the objective lens, or forward and backward directions relative to an extension direction of the objective lens. The forward and backward directions can zoom in and out an object in the field of view of the microscope, and the upward, downward, leftward, and rightward directions can make the range of the field of view of the microscope move upward, downward, leftward, and rightward.

After the operation information is determined, the operation information can be sequenced to obtain the operation sequence. In the process of performing classification mapping to obtain the target diagnostic classification result, classification mapping is performed based on the operation sequence and the video stream feature sequence. In the classification mapping process of this embodiment, an operation sequence and a video stream feature sequence are inputted into the preset mapping rule. Therefore, in the classification mapping process, by further adding a factor of the operation sequence, the medical image video stream and the effect of the operation information corresponding to the medical image video stream are comprehensively considered in the classification mapping process. Because the doctor tends to pay more attention to the region where a lesion is located in the process of observing a section, in the process of classification mapping, a comprehensive consideration of the operation information corresponding to the medical image video stream can lead to a more accurate target diagnostic classification result. Thus, the accuracy of the target diagnostic classification result is further improved.

In an embodiment, the obtaining operation information corresponding to the image video stream includes: determining the operation information corresponding to the video stream according to an inter-frame difference between the video frames of the image video stream.

The operation information corresponding to the video stream can be determined according to an inter-frame difference between the video frames of the medical image video stream. For example, a collected object in a video frame of the medical image video stream is compared with the same collected object in a previous video frame to determine information about a change of the same collected object, to determine information about an operation between the video frame and the previous video frame. By analyzing the video frames, operation information corresponding to the entire medical image video stream can be determined.

According to the method of this embodiment, in the process of analyzing a medical image video stream, operation information can be collected without extra manpower and material resources. Therefore, the medical image analysis method based on this embodiment can maintain the convenience of operations of relevant personnel in the medical image analysis method while improving the accuracy of a target diagnostic classification result.

In an embodiment, after the performing classification mapping based on a video stream feature sequence to obtain a target classification result, the method further includes: displaying the image video stream, and displaying the key-frame information and position information of a currently played video frame at preset positions.

Figure 3:
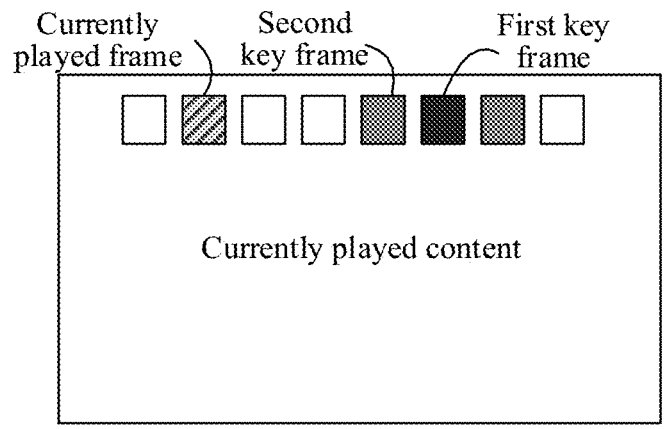
FIG. 3 is a schematic diagram showing an image video stream in an image analysis method according to some embodiments of this application.

In this embodiment, the target diagnostic classification result includes a diagnostic classification result and key-frame information. The key-frame information can be embodied by displaying the medical image video stream and displaying the key-frame information at a preset position. In a specific embodiment, as shown in FIG. 3, thumbnails of the video frames in the medical image video stream are displayed at preset positions, positional relationships between the video frames are reflected through a sorting order of the thumbnails, a first display mode of the video frames is used to indicate whether a frame is a key frame, and a second display mode is used to indicate weight information of the video frame. For example, display colors of the video frames can be used to indicate whether a frame is a key frame, and weight information of the video frame is expressed by a shade of a display color. Therefore, a key frame and a non-key frame are distinguished by a first display mode, and weights of key frames are distinguished by a second display mode. It can be understood that the first display mode for distinguishing a key frame from a non-key frame is not limited to use of colors, and the second display mode for indicating magnitudes of weights is not limited to use of shades of colors. In the process of playing the medical image video stream, a third display mode such as a display color different from the first display mode may be used to display a thumbnail of the currently played video frame to reflect the position information of the currently played video frame.

Based on the image analysis method in this embodiment, after the target classification result is obtained, the image video stream is displayed, and the key-frame information and the position information of the currently played video frame are displayed at preset positions. Therefore, a doctor or another user can understand the key-frame information and the position information of the currently played frame visually when viewing the image video stream.

In an embodiment, single-frame classification results include a classification result and heat maps corresponding to video frames; and a target classification result further includes a heat map of a key frame.

A heat map is an image that represents an effect of a target diagnostic classification result in a classification mapping process. In a classification mapping process of a single-frame picture, inputted single-frame image features are mapped through an activation function to obtain a mapping result. After being pooled, the mapping result is multiplied by a preset class weight to obtain the heat map. The preset class weight can be obtained by training a neural network model. The diagnostic classification result of the single-frame diagnostic classification results can be outputted through a classification function (for example, a softmax function) after pooling.

In this embodiment, the target diagnostic classification result includes not only the diagnostic classification result and the key-frame information corresponding to the video stream, but also the heat map of the key frame corresponding to the key-frame information. The heat map of the key frame can be obtained according to the key-frame information after the key-frame information is determined. That is, the heat map is a product of the preset class weight and the single-frame image features corresponding to the key frame after being mapped by an activation function and pooled.

Because the target diagnostic classification result further includes the heat map of the key frame, which can provide annotation information for subsequent segmentation of a lesion region of tissue, manual annotation is not required, and a large quantity of pixel-level annotation tasks can be reduced, thereby saving a lot of labor costs. Moreover, the target diagnostic classification result further includes the heat map of the key frame, which may further provide a more detailed basis for a doctor to make a diagnosis.

In an embodiment, the displaying the image video stream, and displaying the key-frame information and position information of a currently played video frame at preset positions further includes: correspondingly displaying the heat map of the key frame when the key frame is displayed in the process of displaying the image video stream. Therefore, when the key frame is displayed, information about the effect in the process of obtaining the classification result, that is, the heat map of the key frame, can be correspondingly displayed. Thus, a more detailed information basis is provided for a doctor to make a diagnosis.

In an embodiment, the correspondingly displaying the heat map of the key frame when the key frame is displayed in the process of displaying the image video stream includes: smoothing heat maps of key frames based on the operation information to obtain target heat maps of the key frames; and correspondingly displaying the target heat map of the key frame when the key frame is displayed in the process of displaying the image video stream.

Heat maps are determined separately according to video frames corresponding to key frames, and the heat maps separately determined by several consecutive key frames may not be smooth when played continuously. Therefore, in this embodiment, heat maps separately determined according to video frames corresponding to key frames can be smoothed according to operation information, where the smoothing may include transformation in a spatial domain and averaging in a temporal domain, so that a smoother and more reliable target heat map can be obtained. Therefore, when key frames are displayed in the process of displaying the medical image video stream, transformation of the correspondingly displayed heat maps can be smooth, and errors of the heat maps can be reduced.

In an embodiment, the performing classification mapping based on a video stream feature sequence to obtain a target classification result includes: obtaining patient information corresponding to the image video stream, and determining a patient sequence based on the patient information; and performing classification mapping based on the video stream feature sequence and the patient sequence to obtain the target classification result.

The patient information may include structured information and unstructured information, where the structured information may include a patient name, a patient identifier, a gender, an age, and the like. The unstructured information includes: a patient record in another department, for example, a report in a radiology department. The patient identifier can be identified by a patient serial number, which can be expressed in the form of a character sequence, a barcode or a two-dimensional code. The patient record of the corresponding patient in another department can be searched for through the patient identifier. For example, a barcode is used to search another department in a hospital information system (HIS), for example, a radiology information system (RIS).

After the structured patient information and the unstructured patient information are obtained, the structured patient information and the unstructured patient information can be encoded into a fixed-length feature vector to obtain the patient sequence (which can be represented by FvA). For example, named entities can be extracted from a text in a report through natural language processing (NLP), and the named entities can be encoded into a fixed-length feature vector through embedding, to obtain the patient sequence. In the process of performing classification mapping to obtain the target diagnostic classification result, classification mapping is performed based on the patient sequence and the video stream feature sequence. In the classification mapping process of this embodiment, a patient sequence and a video stream feature sequence are inputted into the preset mapping rule. Therefore, in the classification mapping process, by further adding a factor of the patient sequence, the medical image video stream and the effect of the patient information corresponding to the medical image video stream are comprehensively considered in the classification mapping process. Because the patient information also has reference significance for a diagnosis result, in the process of classification mapping, a comprehensive consideration of the patient information corresponding to the medical image video stream can lead to a more accurate target diagnostic classification result. Thus, the accuracy of the target diagnostic classification result is further improved.

In an embodiment, the performing classification mapping based on the video stream feature sequence and the patient sequence to obtain the target classification result includes: performing a convolution operation on the video stream feature sequence through the preset convolutional layer to obtain the convolution result; and performing fully connected mapping by inputting the convolution result and patient sequence into the preset fully connected layer, and outputting the target classification result by an output layer.

In this embodiment, although the patient sequence is also inputted into the preset mapping rule, where the preset mapping rule may be a neural network model obtained by training, the patient sequence is additionally inputted into the fully connected layer in the neural network model. Therefore, the patient information, as an important factor, is comprehensively considered in the classification mapping process, thereby improving the accuracy of the target diagnostic classification result of the classification mapping.

Figure 4:
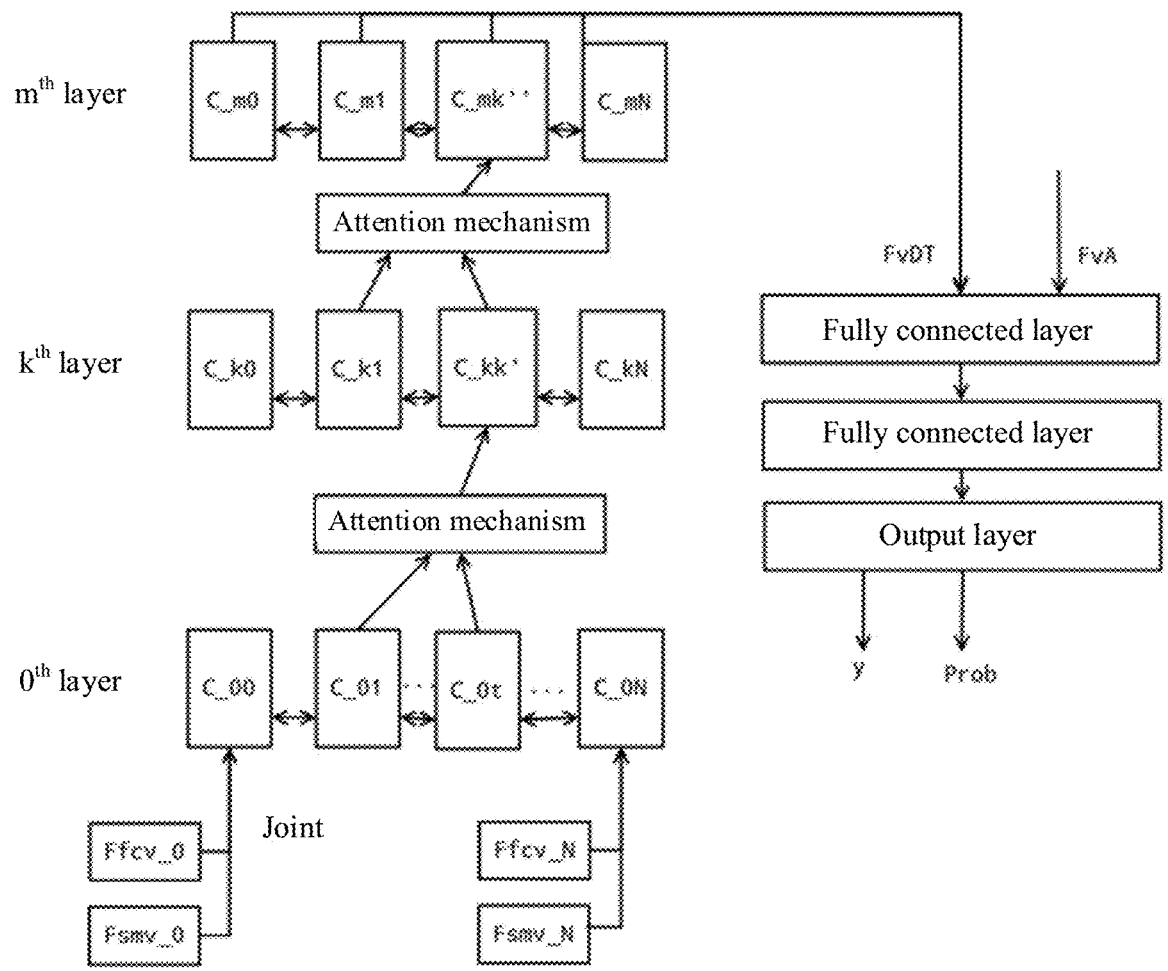
FIG. 4 is a schematic diagram of a principle of an image analysis method according to some embodiments of this application.

In a specific embodiment, after an image video stream is obtained, video frames of the image video stream are extracted, single-frame image features of the video frames are identifies, and the single-frame image features are mapped into single-frame classification results, as shown in FIG. 4,
- a convolution operation is performed on single-frame image features (Ffcv) and single-frame diagnostic classification results (Fsmv) of video frames through a preset convolutional layer of a preset deep convolutional neural network to obtain a convolution result (FvDT), and then fully connected mapping is performed on the convolution result and a patient sequence (FvA) through a preset fully connected layer (FC), to obtain a target diagnostic classification result. For example, the target diagnostic classification result can be outputted through an output layer (SoftMax), and the target diagnostic classification result includes a classification category (y) corresponding to the medical image video stream and a probability (Prob) corresponding to the classification category. As shown in FIG. 4, in the deep convolutional neural network, feature support relationships between video frames corresponding to timestamps are learned by adding an attention mechanism such as an attention window, thereby determining weight information corresponding to the video frames.

Figure 5:
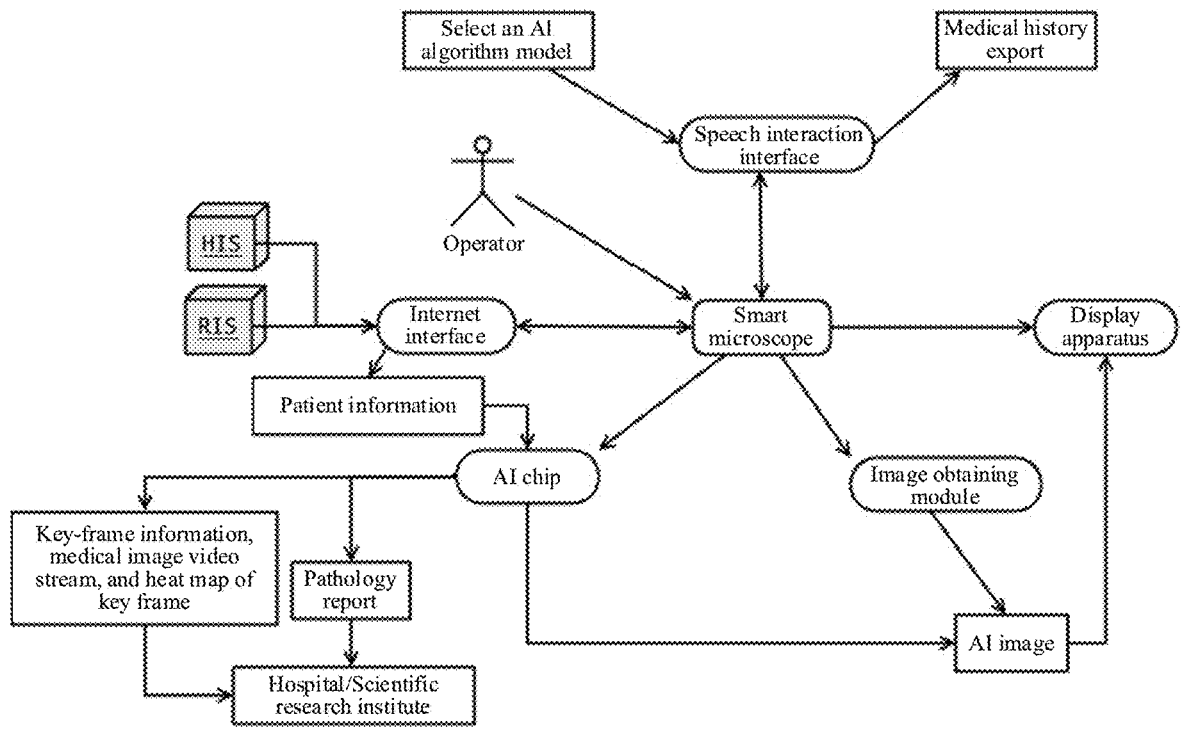
FIG. 5 is a schematic structural diagram of a hardware system of a medical image analysis method according to some embodiments of this application.
Figure 6A:
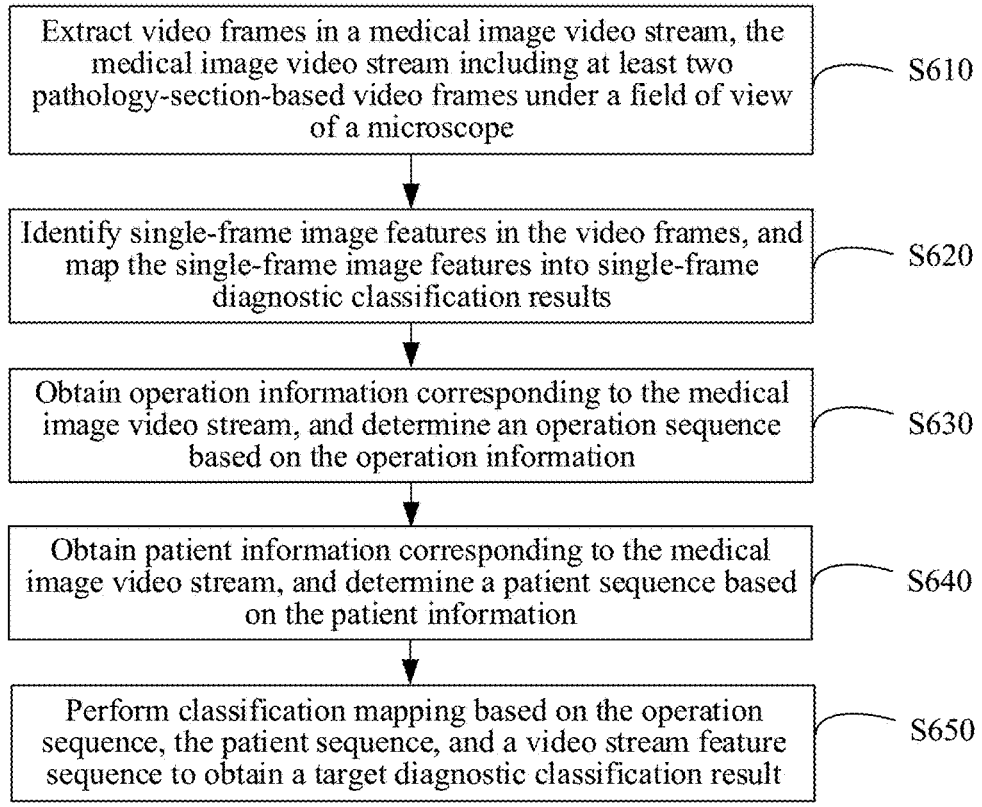
FIG. 6*a* is a method flowchart of a microscope video stream processing method according to some embodiments of this application.

In a specific embodiment, as shown in FIG. 5, an artificial intelligence algorithm type can be selected in advance through speech. For example, through speech, a doctor can select a neural network model for a lung tissue disease, a neural network model for a heart tissue disease, or a neural network model for another tissue disease, which frees the two hands of the doctor. Moreover, because the artificial intelligence algorithm type can be selected, a smart microscope is applicable to a plurality of application scenarios. An operator (such as a doctor) operates the smart microscope to observe a pathology section. In this process, a medical image video stream under the field of view of the microscope can be collected by using a collection apparatus integrated on the smart microscope. HIS, RIS and existing structured information, reports and other patient information are obtained via a network interface integrated on the smart microscope, and then all the patient information is sequenced on the smart microscope to obtain a patient sequence. Video frames of the medical image video stream can be extracted by using the smart microscope, single-frame image features of the video frames can be identified, and the single-frame image features can be mapped into single-frame diagnostic classification results. Further, operation information corresponding to the video stream can be determined by using the smart microscope according to an inter-frame difference between the video frames of the medical image video stream, and an operation sequence can be determined based on the operation information. Classification mapping can be performed by an artificial intelligence chip based on the operation sequence, the patient sequence, and a video stream feature sequence, to obtain a target diagnostic classification result. The target diagnostic classification result includes a diagnostic classification result corresponding to the medical image video stream, key-frame information, and a heat map of a key frame. A pathology report of a corresponding patient can be obtained according to the diagnostic classification result corresponding to the medical image video stream, and the pathology report, the key-frame information, and the heat map of the key frame can be archived accordingly by an undertaking hospital or scientific research institute. Therefore, it is convenient for an undertaking organization and other relevant personnel to view. In this specific embodiment, a result obtained by the artificial intelligence chip can be further displayed in virtual reality through a display module in combination with an image collected by the collection apparatus, so that the target diagnostic classification result can be displayed to a user more visually, where the target diagnostic classification result includes: a contour of a lesion region represented by a heat map, a classification category and a classification probability of the diagnostic classification result, and a key-frame marker. In this specific embodiment, a medical history export instruction can be further received via a speech interaction interface, so that the smart microscope can export a corresponding medical history report. Content of the medical history report may include a pathology report, a picture or a serial number of a key frame, and a heat map on the key frame that are obtained by the artificial intelligence chip. FIG. 6a is a method flowchart of a microscope video stream processing method according to an embodiment of this application. The method is performed by a computer device, and the method includes:

S610: Extract video frames in a medical image video stream, the medical image video stream including at least two pathology-section-based video frames under a field of view of a microscope.

S620: Identify single-frame image features in the video frames, and map the single-frame image features into single-frame classification results.

S630: Obtain operation information corresponding to the medical image video stream, and determine an operation sequence based on the operation information.

S640: Obtain patient information corresponding to the medical image video stream, and determine a patient sequence based on the patient information.

S650: Perform classification mapping based on the operation sequence, the patient sequence, and a video stream feature sequence to obtain a target classification result, the video stream feature sequence including the single-frame image features and the single-frame classification results of the video frames in the medical image video stream.

At least two pathology-section-based video frames under a field of view of a microscope are used, based on which, classification mapping is performed on single-frame image features and single-frame classification results of the video frames information in a time dimension is properly used, and an operation sequence of a doctor and a patient sequence are integrated. Therefore, accuracy of the classification result can be improved, to provide an accurate basis for a medical diagnosis.

Figure 6B:
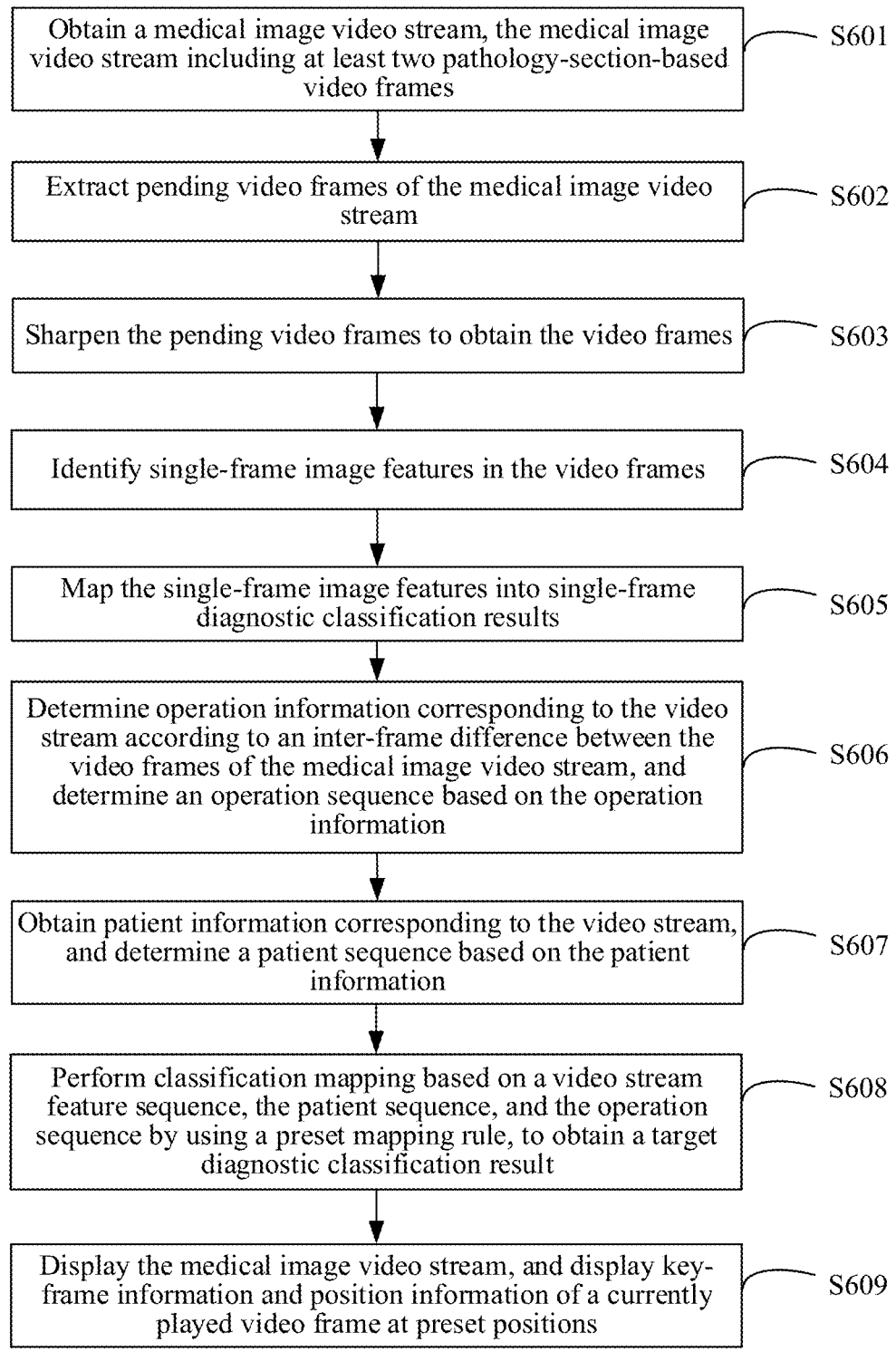
FIG. 6*b* is a schematic flowchart of a medical image analysis method according to some embodiments of this application.

As shown in FIG. 6b, in a specific embodiment, a medical image analysis method includes:

S601: Obtain a medical image video stream, the medical image video stream including at least two pathology-section-based video frames.

S602: Extract pending video frames of the medical image video stream.

S603: Sharpen the pending video frames to obtain the video frames.

S604: Identify single-frame image features in the video frames.

S605: Map the single-frame image features into single-frame diagnostic classification results, the single-frame diagnostic classification results including a diagnostic classification result corresponding to the video frames and a heat map.

S606: Determine operation information corresponding to the video stream according to an inter-frame difference between the video frames of the medical image video stream, and determine an operation sequence based on the operation information.

S607: Obtain patient information corresponding to the medical image video stream, and determine a patient sequence based on the patient information.

S608: Perform classification mapping based on a video stream feature sequence, the patient sequence, and the operation sequence, to obtain a target diagnostic classification result, the video stream feature sequence including the single-frame image features and the single-frame diagnostic classification results of the video frames; and the target diagnostic classification result including a diagnostic classification result corresponding to the medical image video stream, key-frame information, and a heat map of a key frame.

S609: Display the medical image video stream, and display the key-frame information and position information of a currently played video frame at preset positions.

The performing classification mapping based on a video stream feature sequence, to obtain a target diagnostic classification result includes: performing classification mapping based on the single-frame image features and the single-frame diagnostic classification results to obtain the diagnostic classification result corresponding to the medical image video stream; and determining the key-frame information based on weight information corresponding to the video frames in the classification mapping process.

The correspondingly displaying the heat map of the key frame when the key frame is displayed in the process of displaying the medical image video stream includes: smoothing heat maps of key frames based on the operation information to obtain target heat maps of the key frames; and correspondingly displaying the target heat map of the key frame when the key frame is displayed in the process of displaying the medical image video stream.

Based on the medical image analysis method in this embodiment, information about video frames is comprehensively considered, and meanwhile information about a key frame that has a larger effect in a process of obtaining a diagnostic classification result, and operation information are considered. Therefore, the accuracy of a diagnostic classification result can be improved, to provide an accurate basis for a medical diagnosis; and an existing classifier based on a single picture or a single picture feature can continue to be used, to save development costs. Because the target diagnostic classification result further includes the heat map of the key frame, which can provide annotation information for subsequent segmentation of a lesion region of tissue, manual annotation is not required, and a large quantity of pixel-level annotation tasks can be reduced, thereby saving a lot of labor costs. Moreover, the target diagnostic classification result further includes the heat map of the key frame, and the heat map of the key frame is correspondingly displayed when the key frame is played in the process of displaying the medical image video stream, which may provide a detailed basis for a doctor to make a diagnosis.

It is to be understood that, although the steps in FIG. 2, FIG. 6a, and FIG. 6b are sequentially displayed as indicated by arrows, the steps are not necessarily sequentially performed in an order indicated by the arrows. Unless explicitly specified in this application, execution of the steps is not strictly limited, and the steps may be performed in other sequences. In addition, at least some steps in FIG. 2, FIG. 6a, and FIG. 6b may include a plurality of sub-steps or a plurality of stages, and these sub-steps or stages are not necessarily performed at a same time instant, and may be performed at different time instants. The sub-steps or stages are not necessarily performed in sequence, and the sub-steps or stages may be performed alternately with at least some of other steps, sub-steps or stages of other steps.

Figure 7:
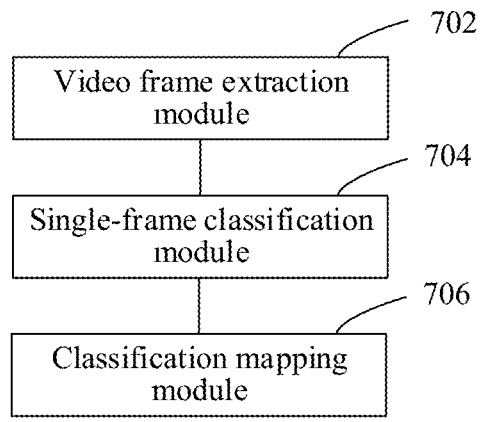
FIG. 7 is a structural block diagram of an image analysis apparatus according to some embodiments of this application.

In an embodiment, as shown in FIG. 7, an image analysis apparatus corresponding to the foregoing image analysis method is provided, including:

a video frame extraction module 702, configured to extract video frames in an image video stream, the image video stream including at least two target-object-based video frames;

a single-frame classification module 704, configured to identify single-frame image features in the video frames, and map the single-frame image features into single-frame classification results; and a classification mapping module 706, configured to perform classification mapping based on a video stream feature sequence to obtain a target classification result, the video stream feature sequence including the single-frame image features and the single-frame classification results of the video frames in the image video stream.

The image analysis apparatus obtains an image video stream, the image video stream including at least two target-object-based video frames; extracts the video frames of the image video stream; identifies single-frame image features in the video frames, and maps the single-frame image features into single-frame classification results; and performs classification mapping based on a video stream feature sequence to obtain a target classification result, the video stream feature sequence including the single-frame image features and the single-frame classification results of the video frames. Because feature extraction and classification mapping are performed based on an image video stream to obtain a target classification result, and the image video stream includes at least two target-object-based video frames, accuracy of the classification result can be improved, to provide an accurate basis for classification of an object.

In an embodiment, the target classification result includes a classification result corresponding to the image video stream and key-frame information.

In an embodiment, the classification mapping module 706 includes:

a classification unit, configured to perform classification mapping based on the single-frame image features and the single-frame classification results to obtain the classification result corresponding to the image video stream; and a key frame determining unit, configured to determine the key-frame information based on weight information corresponding to the video frames in the classification mapping process.

In an embodiment, the video frame extraction module 702 includes a video frame sharpening unit; and a video frame dividing unit, configured to extract pending video frames of the image video stream;

the video frame sharpening unit being configured to sharpen the pending video frames to obtain the video frames.

In an embodiment, the apparatus further includes an operation sequence determining module;

the operation sequence determining module is configured to obtain operation information corresponding to the image video stream, and determine an operation sequence based on the operation information; and the classification mapping module is configured to perform classification mapping based on the operation sequence and the video stream feature sequence to obtain the target classification result.

In an embodiment, the operation sequence determining module is configured to determine the operation information corresponding to the video stream according to an inter-frame difference between the video frames of the image video stream, and determine an operation sequence based on the operation information.

In an embodiment, the apparatus further includes a result display module; and the result display module is configured to display the image video stream, and display the key-frame information and position information of a currently played video frame at preset positions.

In an embodiment, the single-frame classification results include a classification result and heat maps corresponding to the video frames; and the target classification result further includes a heat map of a key frame; and the result display module is further configured to correspondingly display the heat map of the key frame when the key frame is displayed in the process of displaying the image video stream.

In an embodiment, the apparatus further includes a heat map processing module;

the heat map processing module is configured to smooth heat maps of key frames based on the operation information to obtain target heat maps of the key frames; and the result display module is further configured to correspondingly display the target heat map of the key frame when the key frame is displayed in the process of displaying the image video stream.

In an embodiment, the apparatus further includes a patient sequence determining module;

the patient sequence determining module is configured to obtain patient information corresponding to the image video stream, and determine a patient sequence based on the patient information; and the classification mapping module is configured to perform classification mapping based on the video stream feature sequence and the patient sequence to obtain the target classification result.

In an embodiment, the classification mapping module is further configured to perform a convolution operation on the video stream feature sequence through the preset convolutional layer to obtain the convolution result; and perform fully connected mapping on the convolution result and the patient sequence through the preset fully connected layer to obtain the target classification result.

Figure 8:
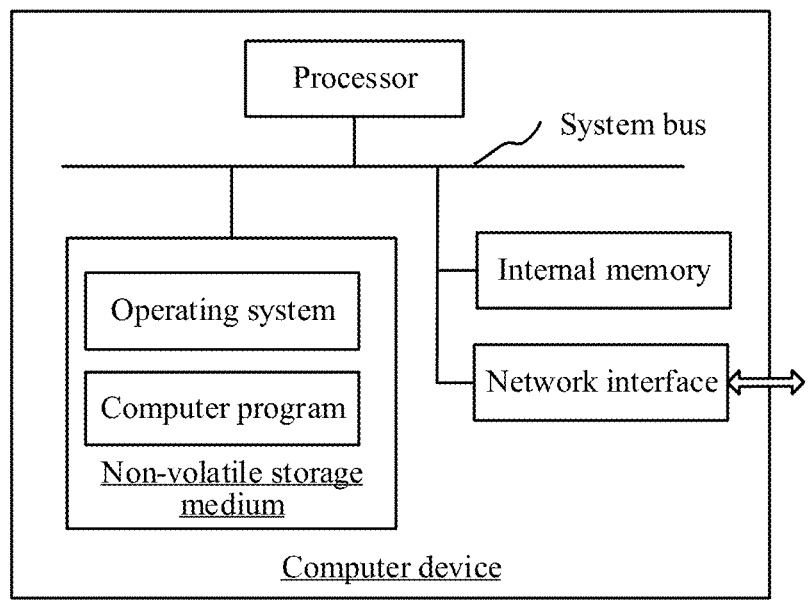
FIG. 8 is a schematic structural diagram of a computer device according to some embodiments of this application.

As shown in FIG. 8, in an embodiment, a computer device is provided, and the computer device can be a terminal or a server. The computer device includes a processor, a memory, a network interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The network interface of the computer device is configured to communicate with an external terminal through a network connection. The computer program is executed by the processor to implement the method in the foregoing embodiments.

The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

A person skilled in the art may understand that, the structure shown in FIG. 8 is only a block diagram of a part of a structure related to a solution of this application and does not limit the computer device to which the solution of this application is applied. Specifically, the computer device may include more or fewer members than those in the drawings, or include a combination of some members, or include different member layouts.

In an implementation, a computer device is provided. The computer device may be a server or a terminal. The computer device includes a processor, a communication interface, a memory, and a communication bus. The processor, the communication interface, and the memory communicate with each other by using the communication bus. The communication interface is an interface of a communication module.

The memory is configured to store program code and transmit the program code to the processor.

The processor is configured to call instructions of the program code in the memory to perform the foregoing method.

In an implementation, a computer-readable storage medium is provided, storing a computer program, the computer program, when executed by a processor, implementing the method in the foregoing embodiments.

In an exemplary embodiment, an embodiment of this application further provides a computer program product including instructions, the product, when running on a server, causing the server to perform the method in the foregoing embodiments.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. References to the memory, the storage, the database, or another medium used in the embodiments provided in this application may all include a non-volatile memory and a volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache. By way of description rather than limitation, the RAM may be obtained in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), a Rambus direct RAM (RDRAM), a direct Rambus dynamic RAM (DRDRAM), and a Rambus dynamic RAM (RDRAM).

The technical features in the foregoing embodiments may be combined in different manners. For concise description, not all possible combinations of the technical features in the embodiment are described. However, provided that combinations of the technical features do not conflict with each other, the combinations of the technical features are considered as falling within the scope recorded in this specification.

While the foregoing embodiments describe several implementations of this application specifically and in detail, the foregoing embodiments should not be construed as a limitation to the patent scope of the present disclosure. A person of ordinary skill in the art may make various changes and improvements without departing from the ideas of this application, which shall all fall within the protection scope of this application. Therefore, the protection scope of the patent of this application shall be subject to the appended claims.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs image analysis and/or microscope video stream processing. In practical application, the foregoing functions may be allocated to and completed by different functional modules according to requirements, that is, an inner structure of a device is divided into different functional modules to implement all or a part of the functions described above.

What is claimed is:

1. An image analysis method for medical diagnosis using a microscope, performed by a computer device that includes one or more processors and memory storing one or more programs for execution by the one or more processors, the method comprising:
   extracting video frames from a medical image video stream captured by the microscope that includes at least two pathological-section-based video frames;
   identifying single-frame image features in the video frames;
   mapping the single-frame image features into single-frame diagnostic classification results;
   performing classification mapping based on a video stream feature sequence that comprises the single-frame image features and the single-frame diagnostic classification results, the classification mapping comprising:
      performing a convolution operation on the video stream feature sequence through a preset convolutional layer;
      obtaining a convolution result in accordance with the convolution operation; and
      performing fully connected mapping on the convolution result through a preset fully connected layer;
      obtaining operation information of the microscope corresponding to the capturing of the medical image video stream;
      performing the classification mapping based on the operation information of the microscope and the video stream feature sequence; and
   determining a target diagnostic classification result corresponding to the medical image video stream and in accordance with the classification mapping.

2. The method according to claim 1, wherein the target diagnostic classification result comprises a classification result corresponding to the medical image video stream and key-frame information of the medical image video stream.

3. The method according to claim 2, wherein performing the classification mapping based on the video stream feature sequence further comprises:
   performing the classification mapping based on the single-frame image features and the single-frame diagnostic classification results to determine the classification result; and
   determining the key-frame information based on weight information corresponding to the video frames in the medical image video stream in the classification mapping.

4. The method according to claim 1, wherein extracting the video frames in the medical image video stream comprises:
   extracting pending video frames of the medical image video stream; and
   sharpening the pending video frames to obtain the video frames.

5. The method according to claim 1, wherein obtaining the operation information of the microscope corresponding to the capturing of the medical image video stream comprises:
   determining the operation information corresponding to the capturing of the medical image video stream according to an inter-frame difference between video frames of the medical image video stream.

6. The method according to claim 1, further comprising:
after the classification mapping, displaying on the computing device the medical image video stream, position information of a currently played video frame corresponding to the medical image video stream, and the key-frame information at preset positions.

7. The method according to claim 6, wherein:
the single-frame classification results comprise a classification result and heat maps corresponding to the video frames;
the target classification result further comprises a heat map of a key frame corresponding to the medical image video stream; and
the displaying further comprises:
correspondingly displaying the heat map of the key frame when the key frame is displayed in the process of displaying the image video stream.

8. The method according to claim 7, wherein the correspondingly displaying the heat map of the key frame when the key frame is displayed comprises:
smoothing the heat map of the key frame based on the operation information to obtain a target heat map of the key frame; and
correspondingly displaying the target heat map of the key frame when the key frame is displayed in the process of displaying the image video stream.

9. The method according to claim 1, wherein performing the classification mapping further comprises:
determining a patient sequence according to patient information corresponding to the medical image video stream; and
performing the classification mapping based on the video stream feature sequence and the patient sequence to obtain the target classification result.

10. The method according to claim 9, wherein performing the classification mapping based on the video stream feature sequence and the patient sequence to obtain the target classification result further comprises:
performing a convolution operation on the video stream feature sequence through the preset convolutional layer to obtain the convolution result; and
performing fully connected mapping on the convolution result and the patient sequence through the preset fully connected layer to obtain the target classification result.

11. A computing device for performing medical diagnosis using a microscope, comprising:
one or more processors; and
memory storing one or more programs for execution by the one or more processors, the one or more programs comprising instructions for:
extracting video frames from a medical image video stream captured by the microscope that includes at least two pathological-section-based video frames;
identifying single-frame image features in the video frames;
mapping the single-frame image features into single-frame diagnostic classification results;
performing classification mapping based on a video stream feature sequence that comprises the single-frame image features and the single-frame diagnostic classification results, the classification mapping comprising:
performing a convolution operation on the video stream feature sequence through a preset convolutional layer;
obtaining a convolution result in accordance with the convolution operation; and
performing fully connected mapping on the convolution result through a preset fully connected layer;
obtaining operation information of the microscope corresponding to the capturing of the medical image video stream;
performing the classification mapping based on the operation information of the microscope and the video stream feature sequence; and
determining a target diagnostic classification result corresponding to the medical image video stream and in accordance with the classification mapping.

12. The computing device according to claim 11, wherein the target diagnostic classification result comprises a classification result corresponding to the medical image video stream and key-frame information of the medical image video stream.

13. The computing device according to claim 12, wherein the instructions for performing the classification mapping based on the video stream feature sequence further comprises instructions for:
performing the classification mapping based on the single-frame image features and the single-frame diagnostic classification results to determine the classification result; and
determining the key-frame information based on weight information corresponding to the video frames in the medical image video stream in the classification mapping.

14. The computing device according to claim 11, wherein the instructions for extracting the video frames in the medical image video stream comprises instructions for:
extracting pending video frames of the medical image video stream; and
sharpening the pending video frames to obtain the video frames.

15. A non-transitory computer-readable storage medium storing computer instructions that, when executed by one or more processors of a computing device for performing medical diagnosis using a microscope, cause the one or more processors to perform operations comprising:
extracting video frames from a medical image video stream captured by the microscope that includes at least two pathological-section-based video frames;
identifying single-frame image features in the video frames;
mapping the single-frame image features into single-frame diagnostic classification results;
performing classification mapping based on a video stream feature sequence that comprises the single-frame image features and the single-frame diagnostic classification results, the classification mapping comprising:
performing a convolution operation on the video stream feature sequence through a preset convolutional layer;
obtaining a convolution result in accordance with the convolution operation; and
performing fully connected mapping on the convolution result through a preset fully connected layer;
obtaining operation information of the microscope corresponding to the capturing of the medical image video stream;
performing the classification mapping based on the operation information of the microscope and the video stream feature sequence; and determining a target diagnostic classification result corresponding to the medical image video stream and in accordance with the classification mapping.

16. The non-transitory computer-readable storage medium according to claim 15, wherein obtaining the operation information of the microscope corresponding to the capturing of the medical image video stream comprises:

determining the operation information corresponding to the capturing of the medical image video stream according to an inter-frame difference between video frames of the medical image video stream.

17. The non-transitory computer-readable storage medium according to claim 15, further comprising:

after the classification mapping, displaying on the computing device the medical image video stream, position information of a currently played video frame corresponding to the medical image video stream, and the key-frame information at preset positions.

* * * * *